United States Patent
Kaisig et al.

(10) Patent No.: US 9,359,119 B2
(45) Date of Patent: Jun. 7, 2016

(54) COMPOSITE SYSTEM FOR PACKAGING

(75) Inventors: Carsten Kaisig, Heidelberg (DE); Torsten Byl, Dossenheim (DE); Erhard Schwartz, Wiesloch (DE); Thomas Stumpf, Dielheim (DE)

(73) Assignee: DEUTSCHE SISI-WERKE BETRIEBS GMBH, Eppelheim (DE)

(*) Notice: Subject to any disclaimer, the term of this patent is extended or adjusted under 35 U.S.C. 154(b) by 399 days.

(21) Appl. No.: 14/002,127

(22) PCT Filed: Mar. 8, 2012

(86) PCT No.: PCT/EP2012/001038
§ 371 (c)(1),
(2), (4) Date: Oct. 29, 2013

(87) PCT Pub. No.: WO2012/123085
PCT Pub. Date: Sep. 20, 2012

(65) Prior Publication Data
US 2014/0044901 A1 Feb. 13, 2014

(30) Foreign Application Priority Data
Mar. 11, 2011 (EP) .................................... 11002043

(51) Int. Cl.
| | | |
|---|---|---|
| *B65D 75/00* | (2006.01) | |
| *B32B 27/10* | (2006.01) | |
| *B32B 29/00* | (2006.01) | |
| *B65D 85/00* | (2006.01) | |
| *C09J 7/04* | (2006.01) | |
| *D21H 19/00* | (2006.01) | |
| *D21H 19/82* | (2006.01) | |

(52) U.S. Cl.
CPC .............. *B65D 75/008* (2013.01); *B32B 27/10* (2013.01); *B32B 29/002* (2013.01); *B65D 85/70* (2013.01); *C09J 7/04* (2013.01); *D21H 19/00* (2013.01); *D21H 19/82* (2013.01); *Y10T 428/1324* (2015.01); *Y10T 428/266* (2015.01); *Y10T 428/2848* (2015.01); *Y10T 428/3179* (2015.04); *Y10T 428/31982* (2015.04); *Y10T 428/31993* (2015.04)

(58) Field of Classification Search
CPC ................. B65D 75/008; B65D 85/70; Y10T 428/1324; Y10T 428/2848; Y10T 428/266; Y10T 428/31982; Y10T 428/3179; Y10T 428/31993; B32B 27/10; B32B 29/002; C09J 7/04; D21H 19/00; D21H 19/82
See application file for complete search history.

(56) References Cited

U.S. PATENT DOCUMENTS

| | | |
|---|---|---|
| 2006/0193952 A1 | 8/2006 | Penttinen et al. |
| 2006/0246307 A1 | 11/2006 | Chang |
| 2006/0257585 A1 | 11/2006 | Schiller et al. |
| 2007/0059541 A1 | 3/2007 | Yoshida et al. |
| 2009/0011219 A1 | 1/2009 | Della Torre et al. |

FOREIGN PATENT DOCUMENTS

| | | |
|---|---|---|
| CN | 2457074 Y | 10/2001 |
| DE | 202005011641 U1 | 10/2005 |
| JP | 2000238796 A | 9/2000 |
| JP | 2002-062572 A | 2/2002 |
| JP | 2005231041 A | 9/2005 |
| JP | 2006069218 A | 3/2006 |
| JP | 2007090699 A | 4/2007 |
| JP | 2008-155432 A | 7/2008 |
| JP | 2008265855 A | 11/2008 |
| JP | 2010069766 A | 4/2010 |
| JP | 2010069767 A | 4/2010 |
| WO | 9631303 A1 | 10/1996 |
| WO | 2008037447 A1 | 4/2008 |
| WO | 2009005947 A1 | 1/2009 |
| WO | 2009112255 A1 | 9/2009 |
| WO | 2010019944 A1 | 2/2010 |

OTHER PUBLICATIONS

Beune, M., Amcor Flexibles, "Barrier Films: SiOx Barrier Benefits," Oct. 1, 2010, http://pffc-online.com/coat-lam/coatings/8832-siox-barrier-benefits-1001, 6 pages.
International Search Report issued in corresponding International Patent Application No. PCT/EP2012/001038 dated Mar. 28, 2012 (3 pages).

*Primary Examiner* — Michael C Miggins
(74) *Attorney, Agent, or Firm* — Kilyk & Bowersox, P.L.L.C.

(57) ABSTRACT

The present invention relates to a multilayer composite system, suited for the manufacture of foil packaging, for example for food. The multilayer composite system is in particular suited for the manufacture of stand-up pouches which are suited for the packaging of liquid food, in particular beverages.

12 Claims, No Drawings

COMPOSITE SYSTEM FOR PACKAGING

This application is a National Stage Application of PCT/EP2012/001038, filed Mar. 8, 2012, which claims priority to European Patent Application No. 11002043.5, filed Mar. 11, 2011.

The present invention relates to a multilayer composite system, suited for the manufacture of foil packaging, for example for food. The multilayer composite system is in particular suited for the manufacture of stand-up pouches which are suited for the packaging of liquid food, in particular beverages.

PRIOR ART

Food systems assembled from composite systems, in particular stand-up pouches or block bottom pouches, are well-known. Typical composite systems for such stand-up pouches are usually adhesive laminated and/or extrusion laminated or coated, respectively, in particular metallic foils being present as barrier layer carrier or as layer for improving mechanical properties. Further layers of such laminates are plastic layers which can have different designs depending on their intended application. Here, the employment of materials which are prepared on the basis of petroleum and/or which are not biodegradable or compostable have been typical to date.

Such composite systems as well as stand-up pouches and manufacturing processes for stand-up pouches or other packaging systems are known from prior art, for example from EP 2 223 866 A1, WO 2008/037447, or EP 0 600 502. The composite systems disclosed therein are not biodegradable, so that packaging manufactured from them can only be disposed of in a conventional manner, while disposal by composting is not possible. At the same time, these composite systems employ starting substances that have been manufactured using high amounts of energy, such as metal foils, and they moreover consume petroleum-based materials. However, it is, in particular also in the field of food, desired to rather switch to eco-compatible materials and in particular to do without metal foils (as these are manufactured using high amounts of energy and other resources, such as water). Compostability would moreover open a simple way of disposal as such laminates and packaging can then be simply correspondingly reused by way of the meanwhile wide-spread waste disposal systems. The application of materials on the basis of renewable resources would moreover not strain the existing resources of petroleum and also contribute to improve the carbon footprint.

WO 2009/005947 A1, WO 96/31303 A1, DE 202005011641 U1, JP 2010069766 A, CN 2457074, and WO 2008/037447 disclose packaging materials.

OBJECT OF THE PRESENT INVENTION

So, it is the object of the present invention to provide a composite system, in particular suited for the manufacture of a stand-up pouch, wherein the composite system comprises the required properties for the manufacture of such food packaging, such as stability, tightness to liquids, gas passage, etc., wherein eco-compatible or biodegradable materials should be employed to the greatest possible extent.

BRIEF DESCRIPTION OF THE INVENTION

This object is achieved by a composite system according to claim 1. Preferred embodiments of this composite system are given in subclaims 2 to 8 and in the following description.

Furthermore, the present invention also provides a food packaging comprising the composite system according to one of claims 1 to 8. This food packaging is preferably a stand-up pouch.

DETAILED DESCRIPTION OF THE INVENTION

The composite system in accordance with the present invention comprises, as an essential component, a layer of paper and at least one barrier layer, and is characterized in that the composite system does not comprise any metal foil.

Further embodiments of the composite system according to the invention and advantages in connection with it are listed below. The additional layers defined below, preferred employed layer materials, layer thicknesses and further embodiments can be each combined with each other as desired; the specific layer sequences of the composite system according to the invention given below serve to describe and illustrate the present invention, which, however, is not restricted to such specific examples.

Paper Layer:

The composite system in accordance with the present invention comprises, as an essential layer, a paper layer. This paper layer typically has a thickness within a range of 150 to 15 µm, preferably 100 to 25 µm, in particular preferred 80 to 30 µm, such as for example 35, 45 or 50 µm. According to the invention, any types of paper can be used, including papers with fillers, such as kaolin, talc, titanium dioxide, starch, calcium carbonate, etc. The paper to be employed according to the invention can be an uncoated or coated paper, papers with very short fibers being preferred. Particularly preferred are transparent papers, e.g. pergamyne paper, a paper manufactured from finished pulp.

The essential paper layer according to the invention is typically present in the final food packaging relatively far on the side of the composite system facing outwards, and the paper layer to be used according to the invention, in particular the preferred paper layer of pergamyne paper, in particular contributes to the mechanical strength and stiffness of the composite system of the present invention. The preferred use of pergamyne paper furthermore leads, due to the transparency of this paper, to various types of printing being possible since reverse printing methods, where the interior side of the pergamyne paper layer is printed, are for example possible (the printout then shows through to the outside, so that in particular any damage and abrasion at the printing on the outer surface of the paper layer can be avoided). The paper material of this layer can furthermore be equipped with additional additives, such as absorbers, etc. Thus, the contribution of this layer to the overall properties of the composite system can be optimized.

Moreover, the use of paper layers permits a contribution to climate protection, since for the manufacture of the paper, including the pergamyne paper, renewable resources are employed, so that here an improvement of the carbon footprint is altogether permitted.

Barrier Layer:

Furthermore, the composite system in accordance with the present invention comprises at least one barrier layer. Depending on the desired embodiment of the composite system, several options are possible here with respect to the type of barrier layer, the position of the barrier layer in the composite system and also with respect to the number of barrier layers. The composite system of the present invention can comprise one or several barrier layers, such as one, two or three barrier layers. These can differ with respect to their type and position in the composite system. The barrier layer can be, for example, a barrier material layer and/or a sealing layer with a barrier property, and/or a lacquer layer, which will each be described below.

Barrier Material Layer:

The first option is the provision of a barrier material layer on the side of the above described paper layer located inside in the food packaging. Such a barrier material layer in accordance with the present invention preferably comprises a carrier layer with a preferably vapor-deposited layer of a barrier material. As an alternative, it is also possible to apply the layer of barrier material as a lacquer as will be described further below. Here, the carrier layer accounts for the major part of the barrier because the preferably vapor-deposited layer of barrier material itself only comprises a few angstrom, and the alternatively provided coat of lacquer is also clearly thinner than the carrier layer. As principal component, the carrier layer preferably comprises a material which is biodegradable and/or made of renewable resources. Materials particularly suited as carrier layer for the barrier material layer to be used according to the invention are polylactic acid materials and cellophane. Polylactic acid materials are already being used for foil materials and packaging, for example as mulch film or for shopping bags. Other known fields of application of polylactic acids are disposable cutlery, straws and boxes with screw caps. Another preferred material for the barrier layer is cellophane, a material also known under the designation regenerated cellulose.

The preferred materials for the carrier layers of the barrier material layer of the present invention already comprise certain barrier fitness, in particular towards liquids. These barrier carrier layers typically have a thickness of about 10 to 100 μm, preferably 12 to 50 μm, in particular preferred 15 to 40 μm, such as for example 25 μm.

However, to ensure the desired barrier property, it is necessary to provide the above defined carrier layer with a layer of barrier material. According to the invention, in particular vapor-deposited barrier materials are here employed because in this way, a desired barrier effect, in particular towards oxygen, $CO_2$, but also towards water vapor can be ensured with a very thin layer (only a few angstrom). Barrier materials suited according to the invention are vapor-deposited layers of (semi)metal oxides or (semi)metals, for example aluminum, $SiO_2$, $Al_2O_3$, or other oxides and mixed oxides or mixtures. Here, the oxide materials are preferred as one can thus altogether do without a metal layer.

The vapor-deposited layer of the barrier material is preferably applied on one side of the carrier layer, however, it is also possible to apply this vapor-deposited barrier on both sides of the carrier layer. Preferably, the barrier, as it is defined above, comprising the carrier layer and the vapor-deposited layer of barrier material, is disposed in the composite system according to the invention such that the vapor-deposited barrier is present on the side of the carrier layer facing away from the paper layer. However, other embodiments are also possible. Often an arrangement is selected based on deliberations with respect to the manufacturing process (that means the sequence of the application/introduction of the individual layers of the composite system) which ensures that the barrier material is covered by a further layer as quickly as possible to protect this relatively sensitive layer from damages in the further manufacturing process.

According to the invention, it is preferred to apply the above defined barrier material layer onto the paper layer described in the beginning. Here, common layers improving adhesion can be applied between them and typically have a thickness of less than 20 μm, in particular preferred is a thickness of 1 to 10 μm, in particular preferred 2 to 5 μm. Suited materials and types of application for such layers are well-known to the person skilled in the art, and suited examples are adhesive layers (extrusion glue, lamination adhesive, etc.). Here it is again preferred for the materials for such adhesive layers to be biodegradable and/or based on renewable resources.

The preferred materials for the carrier layer mentioned above, such as lactic acid materials and cellophane, furthermore permit, due to their smooth surface obtained in film manufacture, the vapor-deposition of very thin layers of barrier material as no major compensation for a rough surface of the carrier layer must be created here. At the same time, the above described barrier materials adhere well to the carrier layer, so that a secure fabrication of the barrier layer comprising the carrier layer and the vapor-deposited layer of barrier materials is ensured.

Apart from its barrier effect, this barrier layer also contributes to mechanical strength, but also to UV-protection. By the use of fillers and additives, these properties can be further modified and optimized, wherein common materials known to the person skilled in the art are employed, for example, as UV-absorbers or fillers to increase stiffness.

Another option of a barrier layer is a correspondingly designed sealing layer which will be described below.

Sealing Layer:

The composite system in accordance with the present invention furthermore comprises a sealing layer which is applied onto one side of the above described barrier material layer. This sealing layer is disposed such that it is the innermost layer among the essential layers of the composite system, i.e. the sealing layer is typically directly the inner layer of a finished food packaging. The sealing layer in accordance with the present invention is also preferably manufactured from biodegradable or preferably even compostable materials and/or from materials based on renewable resources.

In particular polymer materials on the basis of polyesters, for example the polylactic acid materials already described above, but also PBAT (polybutylen-adipate-terephthalate) and other, similar materials as well as mixtures of them are preferred. For example, a material commercially available from BASF under the designation Ecoflex® is suited.

The sealing layer preferably has a thickness of about 10 to 200 μm, preferably 20 to 150 μm, in particular preferred 100 to 50 μm, such as for example 90, 75 or 60 μm.

The sealing layer can also be again provided with additives and fillers, as is described above for the other layers. Again, the properties of the composite system can be modified and optimized by them.

To securely apply this sealing layer onto the above described barrier layer, an adhesion-improving layer can be used again which is designed as already described above. To further improve adhesion, additional techniques for the improvement of the adhesion of the individual layers can be employed, such as surface treatments by flaming methods or corona discharge, etc.

Furthermore, the above described sealing layer can also be coated, preferably vapor-deposited, with barrier materials. For this, the materials already described above can be employed; particularly preferred are here again oxidic coatings, in particular $SiO_x$, $AlO_x$, mixtures of them and other oxides. Such barriers can also be again applied onto one or both surfaces of the sealing layer, the application onto one surface often being sufficient in particular also for cost reasons. If the sealing layer described herein comprises such a barrier layer, it is in some embodiments of the present invention possible to dispense with the above described barrier material layer as in this embodiment, the sealing layer then assumes the barrier effect, so that a layer structure with a paper layer and a sealing layer provided on it is possible, while sufficient barrier properties and mechanical properties of the total composite system are still achieved. By the use of the above described polyester materials, it is again ensured that the composite systems of the present invention essentially consist of materials which are at least biodegradable or preferably compostable, respectively.

Another option of a barrier layer is a coat of lacquer which will be described below Coat of Lacquer Another option for a barrier layer is a coat of lacquer which can be applied, for example, onto the paper layer. Suited examples of coats of lacquer are lacquers based on cellulose nitrate. These can serve, for example, as moisture barrier. Suited ways of application, layer thicknesses and materials for such layers are known to the person skilled in the art.

Adhesive Layers

If required, adhesive layers can be provided between the here described layers for improving adhesion, wherein common adhesive materials known to the person skilled in the art can be employed, for example the extrusion glue and lamination adhesive already discussed above. Suited materials are known to the person skilled in the art and at this point, too, it should be mentioned again that it is preferred for the materials for such adhesive layers to be biodegradable and/or based on renewable resources. Such adhesive layers are preferably employed between the paper layer and the barrier layer, in particular between a paper layer and a carrier layer which is part of an above defined barrier material layer. Furthermore, adhesive layers are preferably provided between the sealing layer and the barrier layer, where it is again a preferred embodiment to provide such an adhesive layer between the sealing layer and the carrier layer of the barrier material layer. However, it is also an option to provide an adhesive layer between the paper layer and the barrier layer or the sealing layer and the barrier layer, such that this adhesive layer is provided in contact with the layer of barrier material. Such adhesive layers improve the adhesion of the individual layers of the composite system, but they can additionally also contribute to barrier properties, in particular against oxygen permeation.

Shellac Layer

Another option is the provision of additional shellac layers which essentially consist of shellac. Such shellac layers can be provided at any position in the composite system, and these layers preferably have a comparably small thickness which is typically less than 20 μm, preferably about 1 to 10 μm, particularly preferred 2 to 5 μm.

Such shellac layers can be provided between the paper layer and the barrier layer, between the barrier layer and the sealing layer, or else between the carrier layer and the layer of barrier material. One or several layers of shellac can be provided to thus further improve the barrier effect of the composite material according to the invention.

The options for barrier layers described herein can be employed individually, but also in combination in the composite system according to the invention, depending on the desired application. The number of these layers can be arbitrarily selected, and for example one, two or three barrier layers which can be the same or different can be present.

The present invention altogether provides an improved composite system suited for the manufacture of food packaging, in particular stand-up pouches, wherein one can dispense with metal foils without any disadvantageous effect on the barrier properties and mechanical properties, and essentially polymer materials based on renewable resources and/or biodegradable polymer materials are employed.

Apart from the above described essential layers and the optional layers improving adhesion, the composite system of the present invention can comprise additional layers, for example a lacquer on the outer surface of the paper layer or another sealing layer on the inner and/or outer surface of the composite system.

So, exemplary composite systems can be structured as follows (from the outside to the inside, in relation to a food packaging):

lacquer/paper layer/adhesive/barrier material layer/adhesive/sealing layer lacquer/paper layer/adhesive/barrier material layer/adhesive/sealing layer with barrier material lacquer/paper layer/adhesive/sealing layer with barrier material paper layer/adhesive/barrier material layer/adhesive/sealing layer lacquer/paper layer/barrier material layer/sealing layer However, the present invention is not restricted to these exemplary embodiments.

The composite system in accordance with the present invention is in particular suited for the manufacture of food packaging, in particular for liquid or semiliquid food, preferably beverages, in particular fruit juices and other fruit containing beverages. The composite system according to the invention in particular permits to manufacture a stand-up pouch by conventional manufacturing processes, so that food packaging can be provided which are essentially based on biodegradable raw materials and can be, for example, completely composted for disposal.

The invention claimed is:

1. Composite system suited for the manufacture of food packaging, comprising a paper layer and a barrier layer, characterized in that the laminate does not comprise any metal foil, and furthermore characterized in that the barrier layer comprises a biodegradable material, wherein the barrier layer comprises a carrier layer and a vapor-deposited barrier material layer, wherein the carrier layer consists of polylactic acid materials or cellophane, and the vapor-deposited barrier material layer consists of vapor-deposited (semi)metal oxides.

2. Composite system according to claim 1, characterized in that the barrier layer is applied onto the paper layer and the sealing layer is applied onto the opposite surface of the barrier layer.

3. Composite system according to claim 1, characterized in that the paper layer consists of transparent paper.

4. Composite system according to claim 1, characterized in that the paper layer comprises a thickness of 10 to 100 μm.

5. Composite system according to claim 1, characterized in that between the paper layer and the barrier layer, a layer improving adhesion is provided.

6. Composite system according to claim 1, characterized in that one, two or three barrier layers are present.

7. Composite system according to claim 1, characterized in that compostable materials are contained, and the composite system is compostable.

8. Composite system according to claim 1, characterized in that a sealing layer is furthermore present.

9. Composite system according to claim 8, characterized in that the sealing layer comprises a vapor-deposited barrier material layer.

10. Composite system according to claim 8, characterized in that between the barrier layer and the sealing layer, a layer improving adhesion is provided.

11. Food packaging, comprising the laminate according to claim 1.

12. Food packaging according to claim 11, characterized in that it is a stand-up pouch.

\* \* \* \* \*